United States Patent [19]

Valentine

[11] 4,004,353
[45] Jan. 25, 1977

[54] EDUCATIONAL DEVICE FOR LEARNING AUTOMOTIVE TROUBLE-SHOOTING

[75] Inventor: Charles G. Valentine, Stamford, Conn.

[73] Assignee: Xerox Corporation, Stamford, Conn.

[22] Filed: Apr. 27, 1973

[21] Appl. No.: 355,134

[52] U.S. Cl. .................................................. 35/13
[51] Int. Cl.² ....................................... G09B 25/02
[58] Field of Search .............. 35/7 A, 10, 13, 19 A

[56] References Cited

UNITED STATES PATENTS

| | | | |
|---|---|---|---|
| 2,893,137 | 7/1959 | Alling | 35/19 A |
| 2,917,834 | 12/1959 | Butler | 35/19 A X |
| 3,077,696 | 2/1963 | Barnett | 35/19 A X |
| 3,080,664 | 3/1963 | Bland | 35/7 A X |
| 3,245,156 | 4/1966 | Bloois | 35/8 A |
| 3,423,846 | 1/1969 | Arend | 35/19 A |
| 3,520,074 | 7/1970 | Severin | 35/48 R |

Primary Examiner—Harland S. Skogquist

[57] ABSTRACT

An educational kit for teaching trouble-shooting procedures in an automotive electrical system is disclosed. The kit comprises an audio-visual instructional means, a simulator board upon which is graphically depicted a schematic diagram of a typical automobile electrical wiring system, and a plurality of manipulative pieces upon which are graphically depicted symbols representing major parts of the electrical system or symbols representing various electrical connections. The pieces are adapted for manipulation on the simulator board whereby the user of the kit may construct and graphically depict the automobile electrical system and the specific component parts and circuitry involved or required in the operation of the system.

5 Claims, 7 Drawing Figures

AUDIO VISUAL MEANS

WORK SHEETS

EDUCATIONAL DEVICE FOR LEARNING AUTOMOTIVE TROUBLE-SHOOTING

BACKGROUND OF THE INVENTION

The present invention relates to an educational kit designed for training in automotive technology. More specifically, the invention deals with an educational learning kit designed to help students of automotive technology understand the automobile electrical system and how to trouble-shoot or diagnose breakdowns in the system.

The automobile is a fairly complex piece of machinery constructed from many complex subsystems. When these subsystems are operating properly and cooperating with one another as they should, a pleasurable drive in the country is there but for the taking. However, when one or more of these subsystems malfunctions, a pleasurable drive in the country often becomes both a regrettable experience for the automobile owner and a delight for the automobile repairman.

Traditionally, an individual interested in automobile technology might avail himself of the opportunity to acquire the skills necessary for the occupation of automobile mechanic or repairman by any one of a number of routes. Often, such skills are acquired by attending trade schools, by taking courses in automotive technology, through military service training, by simple on-the-job training, or by self-training. Regardless of the route taken, the first goal which should be achieved is an understanding of the automobile and its component subsystems, and how each of these subsystems cooperates with the other to achieve a desired result. A second goal is an understanding of specific subsystems, including how they operate, what parts make up the subsystems, how these parts are assembled and how these parts relate to one another. Once these goals have been achieved, the individual is better equipped for training in diagnosis and repair of the various malfunctions occurring in automobile subsystems.

At some point during the learning process, it is most desirable that the student of automobile repair extend beyond charts, manuals or diagrams and be afforded the opportunity to see, examine and manipulate the actual subsystem under study or a model thereof. Physical exposure to the subsystem and its component parts aids the student in better understanding what he hears or reads about it, and complements the learning process by permitting him to inspect, manipulate and arrange the various parts.

Recent years have marked the introduction of a number of educational teaching devices generally aimed at the pre-college or pre-high school age group. The most common of these are the mechanical or computer devices designed to be used by individual students. The theory behind the increasing use of such devices is that account is made of the individual differences in ability, speed and grasp of subject matter, thereby permitting the student to learn at his own pace with minimum supervision by the teacher. Some of these devices also introduce new dimensions into the learning process wherein, for example, spelling may be associated with pictures of objects, mathematical concepts associated with the relative sizes and shapes of objects, or correct responses to questions posed by a computer rewarded by permission to proceed.

The advantages of a teaching method using a device geared for the individual should not be considered restricted to elementary school subjects; occupational learning materials that take into account individual differences in ability, speed and grasp of subject matter also have a better chance of being effective. However, at the present time there are very few educational devices available to the community colleges, vocational high schools and other special schools where various types of mechanical and electrical technologies are sought to be taught on a simplified and individualized basis. There is a great need for occupational learning devices which can be used by the individual student while learning a particular technology and which permit the student to physically simulate the construction or arrangement of parts or concepts involved in the particular systems or subsystems under study prior to examination of the actual system or subsystem.

Accordingly, it is an object of this invention to provide a novel approach toward the learning of automobile systems and subsystems.

Another object is to provide an educational kit comprising instructional means and simulator means for teaching the automobile electrical system and how to diagnose breakdowns in the system.

Another object is to provide an occupational educational kit which is simple, relatively inexpensive, rugged, easily assembled, relatively portable and easily understood.

Another object is to provide an educational kit designed for use by individual students comprising audio, visual or audio-visual instructional means, a simulator board having graphic indicia thereon, and a plurality of manipulative pieces having graphic indicia thereon comprising symbols representative of the major parts or wiring connections involved in an automobile electrical system, whereby the student may manipulate the pieces on the simulator board in response to said instructional means to graphically depict the wiring, relationship of parts and electrical connections involved in an automobile electrical system.

SUMMARY OF THE INVENTION

In accordance with the teachings of the present invention, a simple and effective educational kit for the teaching of automotive electrical wiring and automotive electrical trouble-shooting is provided. The kit comprises instructional means, a simulator board upon which is graphically depicted a schematic diagram of an automobile electrical wiring circuit and a plurality of pieces upon which are graphically depicted symbols representing various components of an automobile electrical system and electrical connections for activating certain circuits. The kit may also comprise a display board which provides for storage and easy access to the various pieces when the kit is in use. The kit is designed to present the fundamentals of the circuitry, operation and repair of an automobile electrical system using a programmed, multimedia approach whereby the student hears and sees information, performs by answering questions, solving problems and manipulating objects. The kit is designed for individual use or use by small groups without the need for extensive supervision or participation by an instructor. It permits the student to learn at his own pace, and also affords him the chance to capitalize on the way he learns best because he participates in different kinds of learning experiences. He listens to information while viewing a series of related visuals and participates in a manipulative activity which gives him a chance to try doing himself what he has been shown or told how to do. He is thus totally involved in the learning process.

DETAILED DESCRIPTION OF THE INVENTION

The preferred instructional means employed in the unit is an audio-visual presentation using slides or filmstrips in conjunction with a descriptive audio account of the visuals. The visual materials are synchronized with the audio presentation. A recorded narrator provides background information descriptive of the automobile electrical system including the major component parts and how failures in any of the major electrical subsystems are properly diagnosed. For example, certain symptoms of automotive electrical failure are disclosed to the student and he is instructed how to proceed in order to either directly isolate the particular electrical subsystem causing the trouble or, by the process of elimination, remove from consideration other systems which might cause the trouble such as the fuel or mechanical systems. During this audio presentation, a series of synchronized related visuals are shown to the students. These visuals comprise photographs or diagrams of the various components and mode of operation of the various systems and subsystems described in the audio presentation.

The audio-visual equipment needed will vary depending on the type of instruction to be given. A rear screen projector for small groups, or a projector and screen for a classroom presentation may be used. For the audio presentation, either visual projection equipment with built-in audio capability or a separate cassette recorder may b used. The instructional means provided with the educational kit includes a video segment available, for example, or 35mm slides or filmstrips, and an audio segment available on cassettes. The supporting equipment is normally not included.

At various points during the presentation, the student is requested to stop the audio-visual presentation and perform certain activities using the simulator board and pieces associated therewith. He may be requested to position a series of pieces bearing symbols representative of the various component parts of the electrical system at the appropriate locations on the circuit depicted on the simulator board or to choose and position one of several pieces bearing schematic indicia representing electrical connections in order to properly complete and activate certain selective circuits depicted on the simulator board. The simulator activity allows a student to use his hands as a learning tool, as well as his eyes and ears. By performing an activity using the simulator board and its accessories, the student takes an active part in the learning process and achieves understanding more quickly.

The simulator board and the accessories are best described with reference to the attached drawings.

DETAILED DESCRIPTION OF THE DRAWINGS

Figure 1:
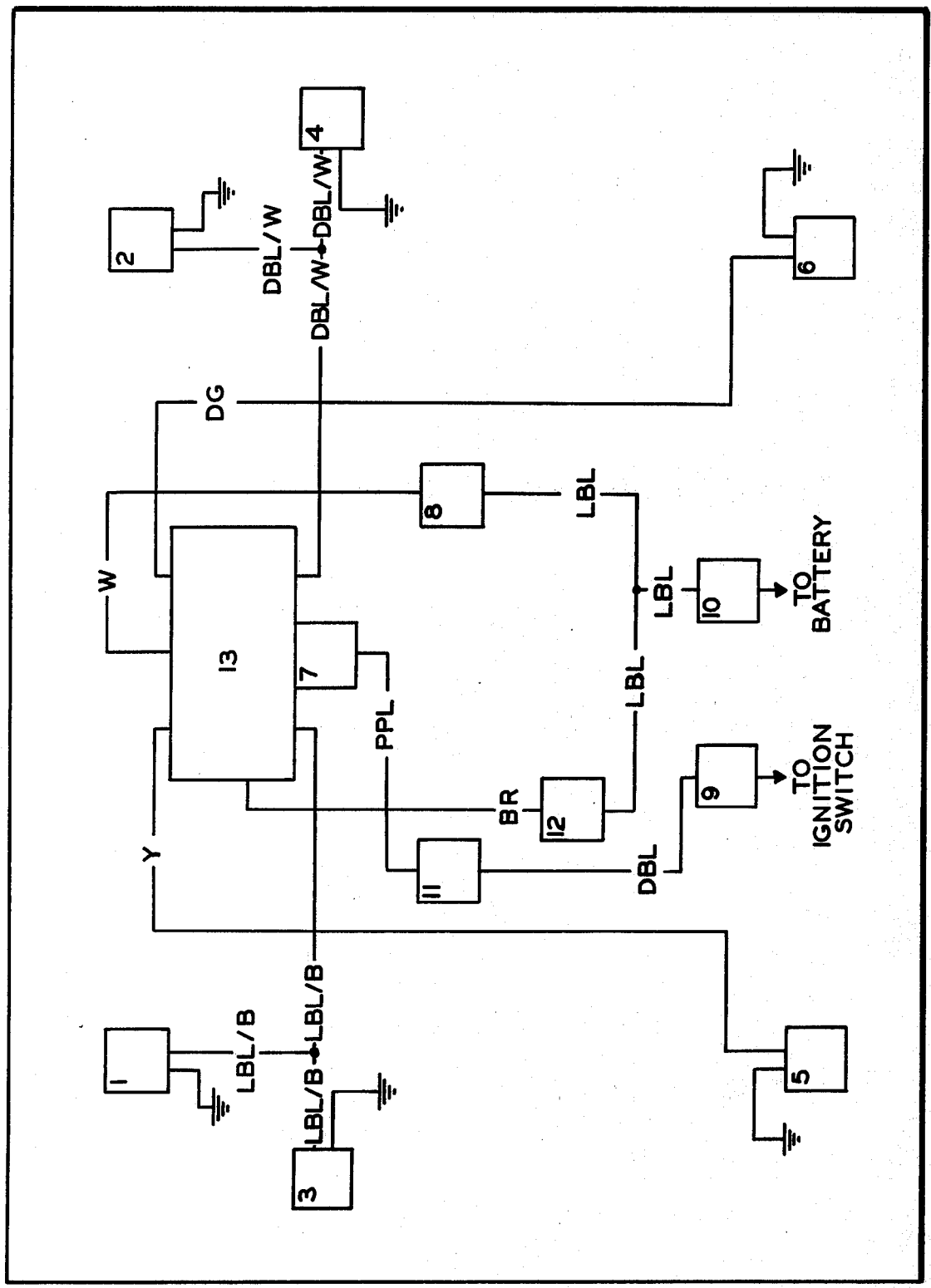
FIG. 1 is a plan view of the simulator board with graphic indicia thereon.

In FIG. 1, the simulator board is shown having printed thereon graphic indicia representative of an automobile electrical circuit. The indicia comprises a schematic diagram of a wiring system connecting a plurality of blocked spaces or boxes which contain numerical indicia ranging from 1 through 13. At intervals along the wiring there are present abbreviations for various colors to indicate that the wiring is to be considered of that color. This simulates the actual colored wiring present in automobile wiring used to facilitate wire tracing. The symbol "W" stands for white, "LBL" for light blue, "DBL" for dark blue, "Y" for yellow, "BR" for brown, "PPL" for purple, "DBL/W" for dark blue with a white stripe, "LBL/B" for light blue with a black stripe, and so forth. Certain of the boxes such as 1, 2, 3, 4, 5 and 6 are shown connected to a ground, while boxes 9 and 10 are indicated to be connected to the ignition switch and battery, respectively.

The board is constructed of a magnetically attractive sheet of a rigid material such as galvanized steel, over which is painted a neutral background color such as a white enamel. The graphic indicia present on the board is printed over the enamel in a suitable contrasting color such as black. Printing may be accomplished by any suitable means, for example, a silk screening process. In the alternative, the indicia may be printed on a sheet of plastic or paper film which is adapted to be placed over a blank simulator board. Although the simulator board may consist solely of a thin sheet of metal with suitably smooth edges, the metallic sheet is preferably laminated to a suitable backing member which imparts suitable rigidity thereto. Thus, in the preferred embodiment the simulator board comprises a thin sheet of ferrous metal having a thickness of about 1/32 of an inch laminated to a backing member made from a rigid material such as fiberboard, or a resinous material, said backing material having a preferred thickness of about ¼ of an inch. The dimensions of the simulator board are such that it can be conveniently used by the student at a given workplace. Boards having dimensions of about 15 × 20 inches, or approximately 300 square inches, are particularly suitable.

Figure 2:
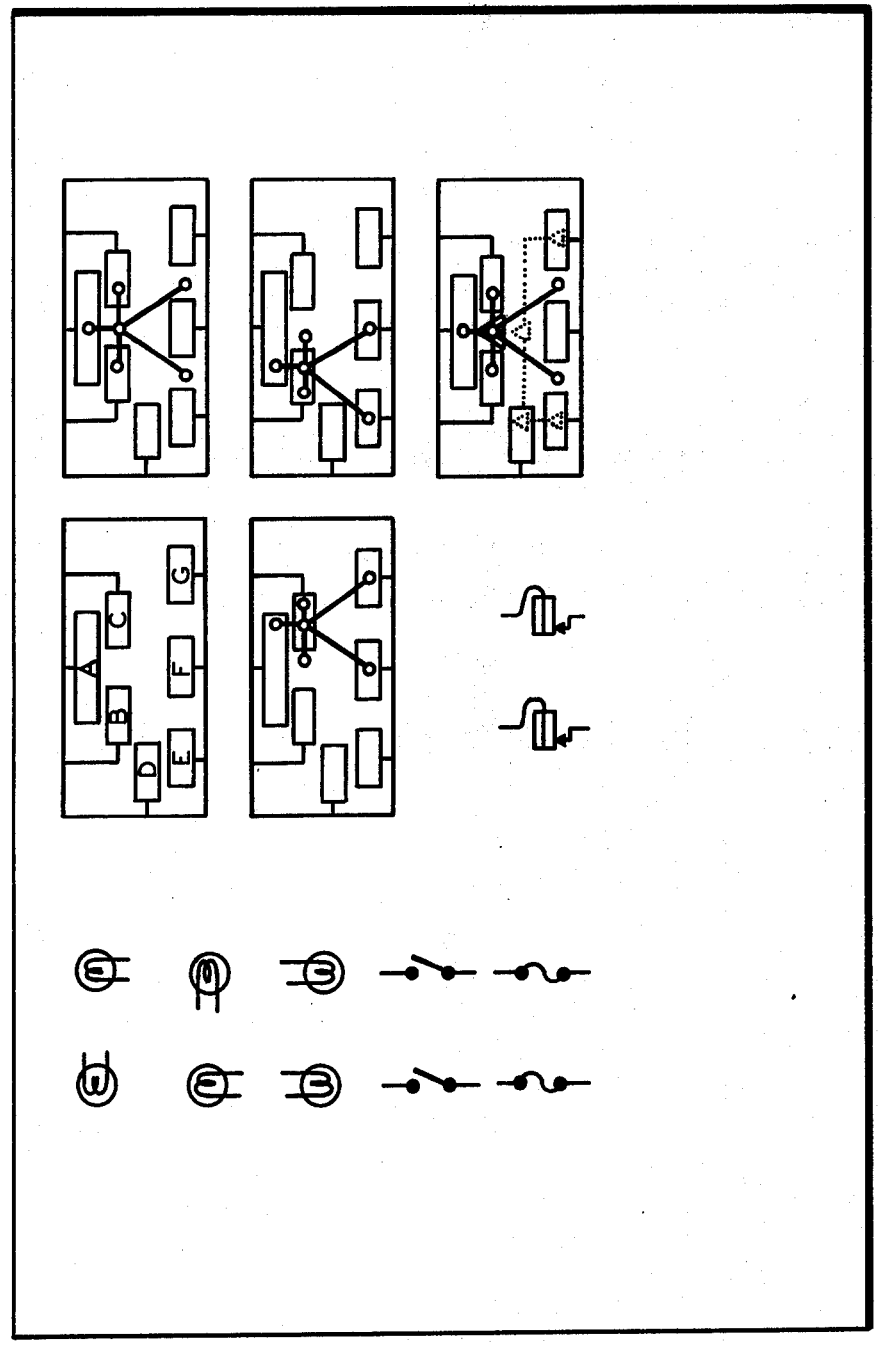
FIG. 2 is a plan view of the display board with graphic indicia thereon.

In FIG. 2 a display board is shown having printed thereon in spaced relationship graphic indicia symbolic of the various parts of the automobile electrical system or of electrical connections. The display board is also constructed of a magnetically attractive rigid material similar to the simulator board and the background and indicia may be printed thereon in the same way. The purpose of the display board is to serve as a display and storage area for the magnetically attractive pieces which are used in conjunction with the simulator board. Each of the spaced graphic indicia printed on the display board corresponds to the indicia printed on one of the pieces, thereby facilitating systematic storage and display of the pieces and allowing for quick inspection to determine that all of the pieces are accounted for. The edges of the board should be either smooth or rolled over to prevent injury from sharp edges.

Figure 3:
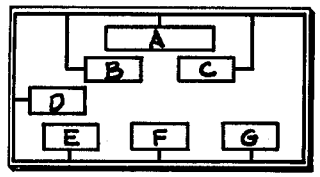
FIG. 3 is a plan view of the manipulative pieces having graphic indicia thereon comprising symbols representative of the various parts and electrical connections involved in an automobile electrical system.
Figure 3:
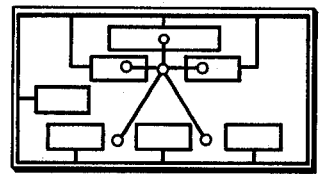
Figure 3:
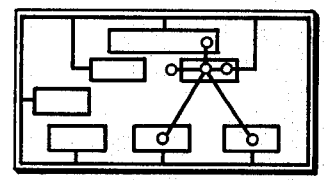
Figure 3:
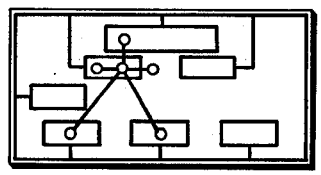
Figure 3:
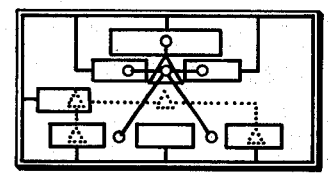
Figure 3:
Figure 3:
Figure 3:
Figure 3:
Figure 3:
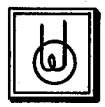
Figure 3:
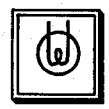
Figure 3:
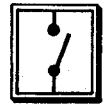
Figure 3:
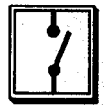
Figure 3:
Figure 3:
Figure 3:
Figure 3:

The manipulative pieces used in the educational kit are shown in FIG. 3. Each of these pieces consists of a flat sheet of a rigid material such as metal or plastic upon which is printed one of several schematic indicia symbolic of various parts of the automobile electrical system or electrical connections. In the preferred embodiment, the pieces are made of a plastic material such as polyvinyl chloride having a thickness of about 1/16 of an inch and having smaller sections of a magnetically attractive material laminated to the underside thereof. The smaller sections also serve to provide a gap between the piece and the surface upon which it is resting to facilitate gripping and manipulation of the piece on flat surfaces. The indicia represented on the pieces are symbols for the various lights present on the automobile, symbols for switches, symbols for fuses, symbols for directional signal flasher switches or symbols for contact switching mechanisms. In the preferred embodiment there are six pieces having graphic indicia symbolic of lights, shown as 3-A through 3-F in FIG. 3. Two switch pieces are shown as 3-G and 3-H. Two fuse pieces are shown as 3-I and 3-J. Two directional flasher pieces are shown as 3-K and 3-L. Pieces bearing indicia representative of the contact shifting mechanism (master control panel) are shown as 3-M through 3-Q. Piece 3-M depicts seven terminals lettered A through G, each of which terminals is connected to a simulated lead wire running to the edge of the piece. When this piece is positioned on the simulator board at box number 13, the lead wires on the piece connect with the simulated lead wires on the board. Pieces 3-N, 3-O, 3-P and 3-Q are similar to piece 3-M except that the terminals are not lettered and certain terminals are connected with one another to simulate completed circuits. For example, piece 3-N depicts a connection between terminals A, B and C shown on piece 3-M. Piece 3-O depicts a connection between terminals A, C, F and G. Piece 3-P depicts a connection between terminals A, B, E and F. Piece 3-Q depicts a connection between terminals A, B and C with additional contacts represented by a dotted line with terminals D, E and G. The size and shape of the various pieces is such that they fit or can be manipulated at the appropriate indicia present on the simulator board as hereinafter described.

Figure 4:
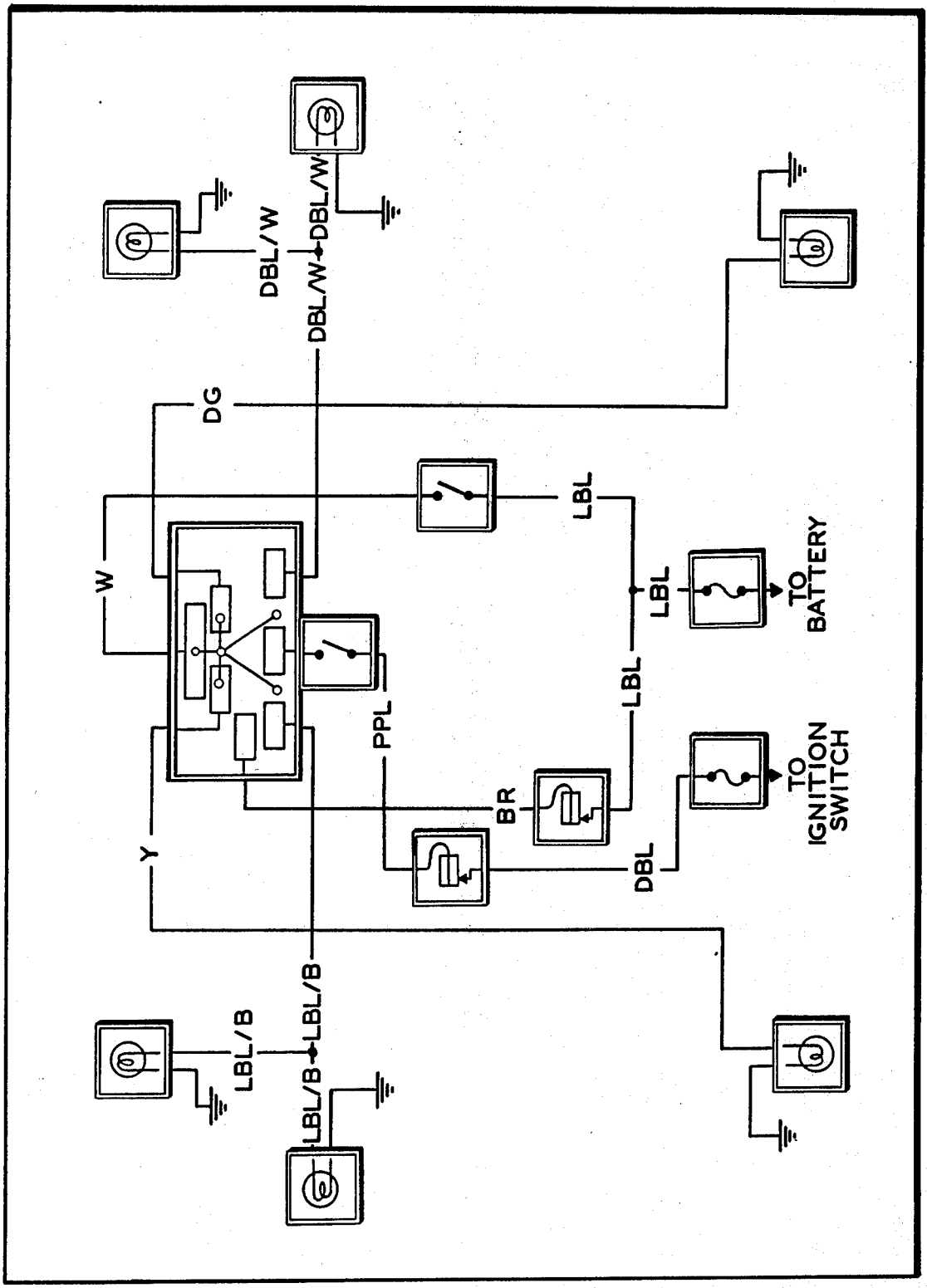
FIG. 4 is a plan view of the simulator board with certain of the manipulative pieces in place.
Figure 5:
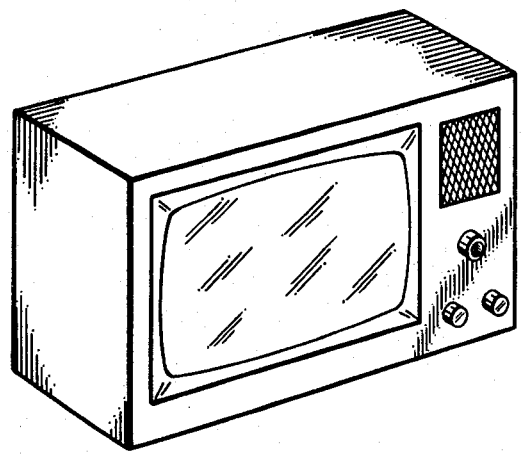
FIG. 5 illustrates generally an audiovisual device suitable for use in the present invention.
Figure 6:
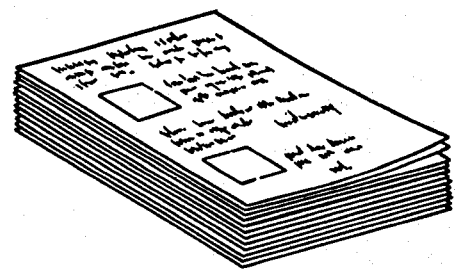
FIG. 6 illustrates generally worksheets in accordance with the present invention.
Figure 7:
FIG. 7 is a side-sectioned view of a typical manipulative piece in accordance with the invention showing smaller magnetic sections laminated to the underside of the piece.

In FIG. 4 the simulator board is shown with pieces representative of the lights, switches, fuses, directional flasher switches and contact shifting mechanism 3-N in place. The scheme shown represents a circuit for the brake lights activated by a simulated closing of the brake switch located at box 8 on the simulator board.

As indicated above, the surfaces of the simulator board, the display board and at least the bases of the manipulative pieces are made from or contain a magnetically attractive material. The term magnetically attractive material is intended to encompass a material that is either itself magnetic or a material that is attracted to a magnet. Thus, where the surface of the boards is magnetic, the bases of the pieces need be only of a material that is attracted to a magnet. In the simpler and preferred embodiment, the bases of the pieces have laminated thereto a section of a magnetic material such as magnetic ferrite plastic or metal, and the boards are made of material that is attractive to a magnet such as galvanized steel.

All of the above materials are most conveniently supplied housed in a compartmentalized case for easy use and storage. Thus, the educational kit includes the simulator board, the display board, the manipulative pieces, the visual slides or tapes and the audio cassette. The kit may also include student worksheets, sample tests or quizzes to be given by the instructor before and after use of the unit, and an instructor's manual.

To illustrate how the educational kit might be used, the audio-visual presentation begins with a discussion of how an automobile mechanic should properly trouble-shoot or diagnose various ailments which might be present in the automobile electrical system. Various types of automotive problems are discussed such as the failure of an engine to crank, the failure of a cranking engine to start, or the failure of an engine to run smoothly. Various techniques for isolating the most probable cause of these failures are discussed, including direct isolation of the problem and isolation by the process of elimination. This instructional material is presented to the student by means of visual slides and a synchronized audio presentation. At certain points during the presentation the student may be presented with symptoms of automobile failure and asked to analyze and resolve the situation himself. The presentation next focuses on the automobile electrical system per se, and the student is introduced to electrical wiring diagrams and how these diagrams are read so as to be relatable to the electrical system of the automobile. The student is told that in many cases location and isolation of defects occurring in the electrical system requires a knowledge of electrical circuitry, an ability to read electrical diagrams, and an ability to trace or follow various wires which form some of the electrical circuits. Using the simulator board and the related accessories, the student may then be instructed to place the various manipulative pieces which bear symbols depicting various component parts of the electrical system at the appropriate positions on the simulator board. The student is instructed to place pieces 3-A through 3-F symbolizing lights at boxes 1 and 2 of the simulator board to represent the front parking lights, at boxes 3 and 4 to represent the indicator lights on the dash, and at boxes 5 and 6 to represent the taillights. He is then instructed to place pieces 3-G and 3-H which represent switches in boxes 7 and 8. After a discussion, for example, of the function of the fuse and the electrical system, he is then requested to place the two pieces 3-I and 3-J which represent fuses in boxes 9 and 10 on the simulator board. He is then requested to place pieces 3-K and 3-L representing the flasher switches at the appropriate location on the simulator board which would be boxes 11 and 12.

Various of the circuits represented on the simulator board are completed using a contact shifting mechanism or master control panel. Various contact switching mechanisms are represented by pieces 3-M through 3-Q. The student is first asked to place piece 3-M at location 13 on the simulator board such that the various circuits and lead wires can be associated with the various terminals which are lettered A through G on piece 3-M. Next, the student would be asked how the circuit should be completed in order to activate the brake lights. This circuit would be completed by placing piece 3-N at location 13 on the simulator board. This piece shows a connection between terminals A, B and C such that when the switch represented by pieces 3G or 3K located at 8 on the simulator board is closed, the brake lights present at locations 5 and 6 on the simulator board would be activated. The student may then trace the circuit on a separate worksheet using the coloring of the wiring which is depicted on the simulator board. Next, the student would be asked to construct a circuit for the right-hand directional signals. This would be done by positioning piece 3-O at location 13 on the simulator board. In similar fashion, the circuit for a left-hand directional signal would be completed by placing piece 3-P at location 13 on the simulator board. The cirucit required for the emergency flasher system on an automobile would be completed by placing piece 3-Q at location 13 on the simulator board. After constructing each circuit, the student can study the simulator board to observe what systems are or are not involved in each circuit such as the battery alone or the battery and the ignition switch, and the like. The simulator board and the accessory pieces thus permit the student to simulate any one of a number of relationships which graphically depict the automobile electrical system and the specific circuitry involved or required to carry out a given function, thereby permitting the student to demonstrate his understanding of these systems.

The above-described educational kit is programmed such that the student will encounter a minimum of frustration and a maximum of learning efficiency during use of the kit. Upon completion of the kit, the student should be able to describe in one paragraph or less a general procedure consisting of six steps for determining and correcting trouble when an automobile is not functioning properly; name the four major systems to be checked when an automobile is not functioning properly; name four systems to be checked when an engine will not start; name five subsystems in an automobile electrical system; name the components in any circuit, state the wire colors from the common codes used, and trace a complete circuit path in an automobile wiring diagram; and list the major causes of ignition or electrical failure.

A complete description of the educational kit encompassed by the present invention may be found in a booklet entitled "Automotive Technology — Automotive Trouble-Shooting Procedure" (Unit 10139-80) published as part of the Occupational Technology Series by the Xerox Corporation.

What is claimed is:

1. An educational kit for teaching automotive electrical wiring and automotive electrical trouble-shooting procedures comprising as integrated component parts thereof:

a. a simulator board having a surface of magnetically attractive material and including graphic indicia on the surface thereof defining a schematic diagram of an automobile electrical system, said diagrams further including designated locations for positioning manipulative pieces bearing indicia representing electrical symbols, the indicia on said simulator board being as shown by the non-numerical indicia of FIG. 1;

b. a plurality of magnetically attractive manipulative pieces individually bearing graphic indicia on their surfaces comprising symbols representing parts of an auotmobile electrical system or symbols representing electrical connections, the indicia on said manipulative pieces being as shown by the non-numerical indicia of FIG. 3;

c. audiovisual instructional means including synchronized recordings and visual slides or filmstrips presenting information relevant to the automotive systems including information defining the relationship between the indicia on said pieces and the indicia on said simulator board;

said audiovisual instructional means further characterized in that it is periodically stopable to permit the user to perform a manipulative activity requested by the instructional means using said simulator board and said manipulative pieces, and being restartable again by the user upon completion of the activity;

d. a display board for said manipulative pieces including a sheet of magnetically attractive material. said display board having graphic indicia on a surface thereof in spaced relationship, said graphic indicia corresponding to the indicia present on each of said manipulative pieces, said manipulative pieces adapted for storage on and removal from said display board;

said manipulative pieces adapted for manipulation on the simulator board and in conjunction with the simulator board indicia by the user in response to said instructional means such that the automobile electrical system and component parts and circuitry thereof can be constructed and graphically depicted, said magnetically attractive board or alternatively each of said magnetically attractive pieces being magnetic to provide a mutual attraction between said pieces and said board.

2. An educational kit according to claim 1 wherein the indicia present on the surface of the manipulative pieces depicts electrical symbols representative of lights, fuses, switches or contact shifting mechanism.

3. An educational kit according to claim 1 wherein said instructional means includes a plurality of student worksheets, said worksheets being adapted for use by the student to record information and test the student in response to said audio-visual instructional means.

4. An educational kit according to claim 1 wherein the manipulative pieces are magnetic.

5. An educational kit according to claim 4 wherein the manipulative pieces are constructed of a flat sheet of a rigid material having smaller sections of a magnetic material laminated thereto.

* * * * *